W. ROBERTS.
SEWING MACHINE.

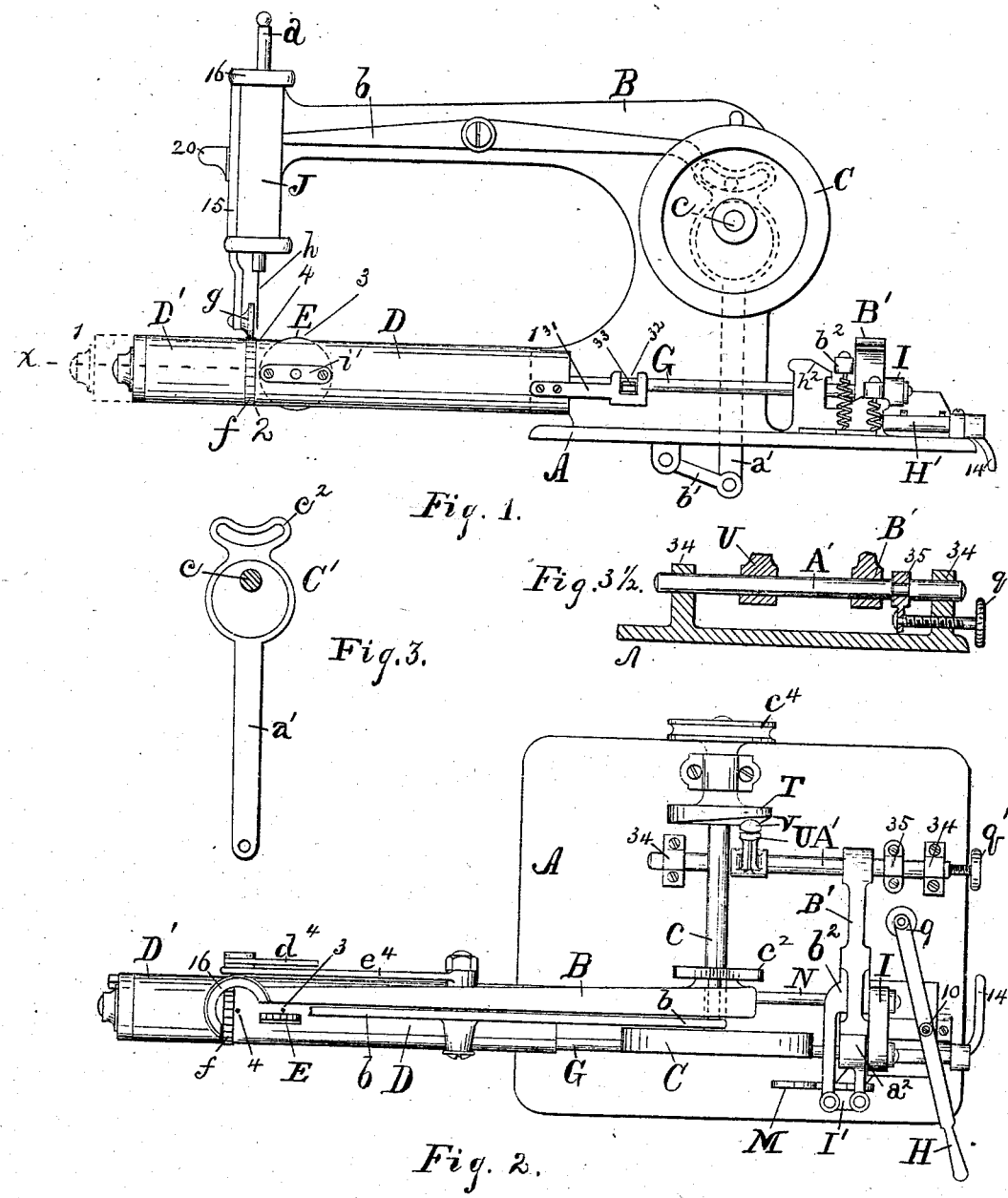
(Model.)
W. ROBERTS.
SEWING MACHINE.
No. 254,696.    Patented Mar. 7, 1882.
4 Sheets—Sheet 1.
Witnesses:
W. L. Langley
A. E. Eader
Inventor:
William Roberts
By his Atty
Chas. B. Mann (Model.)
W. ROBERTS.
SEWING MACHINE.
No. 254,696.   Patented Mar. 7, 1882.
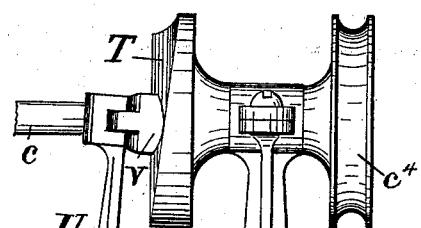
Fig. 4.
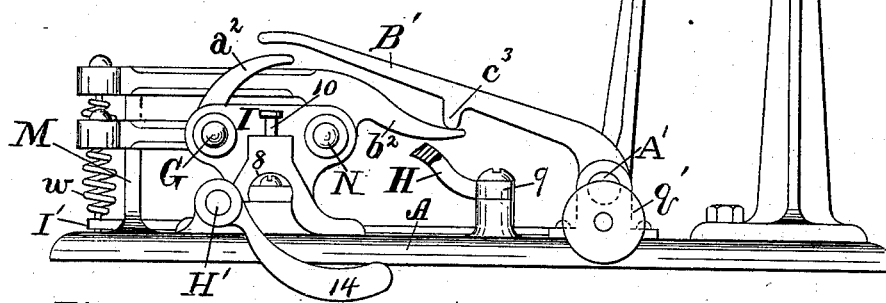
Fig. 6.   Fig. 5.
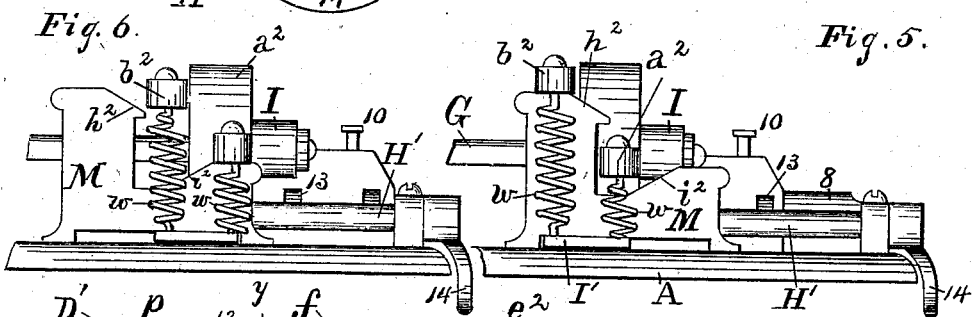
Fig. 7.
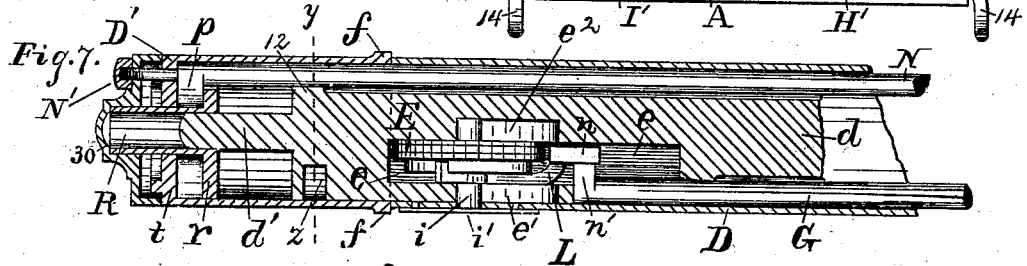
Fig. 8.
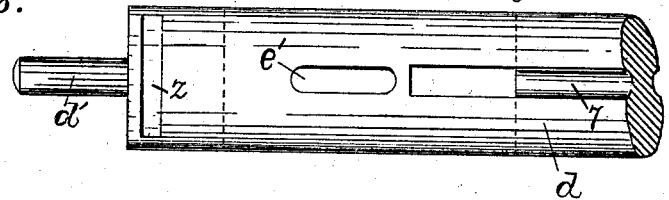
Witnesses:
W. L. Langley.
A. C. Eader.
Inventor:
William Roberts
By his Atty
Chas. B. Mann (Model.)

No. 254,696.  Patented Mar. 7, 1882.

4 Sheets—Sheet 3.

Witnesses:
W. L. Langley.
A. C. Eader.

Inventor:
William Roberts
By his Atty
Chas B. Mann (Model.)

W. ROBERTS.
SEWING MACHINE.

No. 254,696. Patented Mar. 7, 1882.

Witnesses:
W. L. Langley.
A. E. Eader.

Inventor:
William Roberts
By his Atty
Chas. B. Mann

UNITED STATES PATENT OFFICE.

WILLIAM ROBERTS, OF BALTIMORE, MARYLAND.

SEWING-MACHINE.

SPECIFICATION forming part of Letters Patent No. 254,696, dated March 7, 1882.

Application filed August 31, 1881. (Model.)

*To all whom it may concern:*

Be it known that I, WILLIAM ROBERTS, a citizen of the United States of America, residing at Baltimore, in the county of Baltimore and State of Maryland, have invented certain new and useful Improvements in Sewing-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a machine for sewing uppers of boots and shoes; and it consists in the combination and arrangement of parts hereinafter set forth, and designated in the claims.

Figure 9:
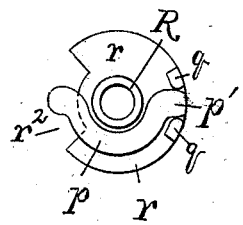
Figure 10:
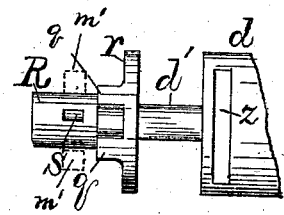
Figure 11:
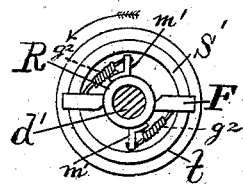
Figure 12:
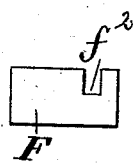
Figure 13:
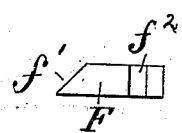
Figure 14:
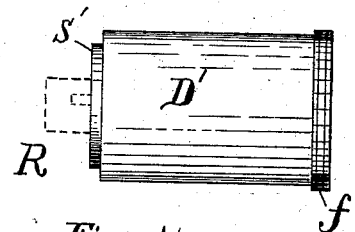
Figure 15:
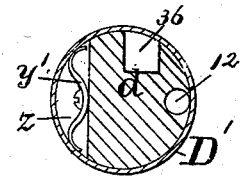
Figure 16:
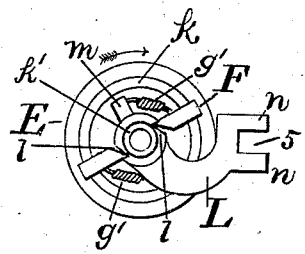
Figure 17:
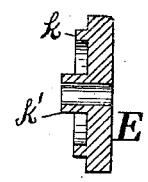
Figure 18:
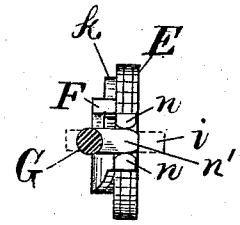
Figure 19:
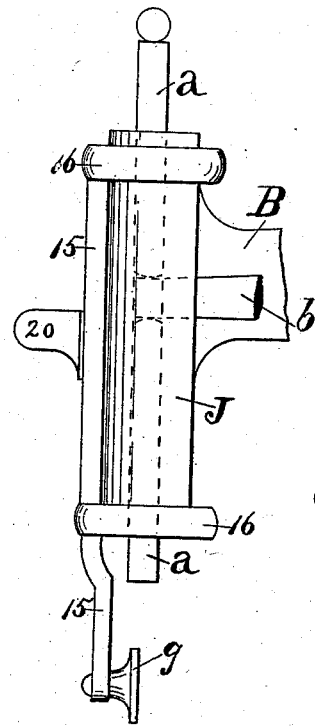
Figure 20:
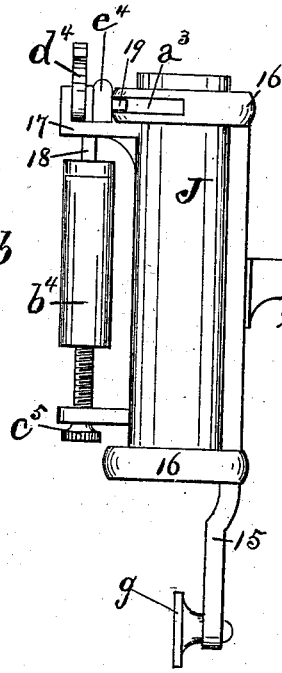
Figure 21:
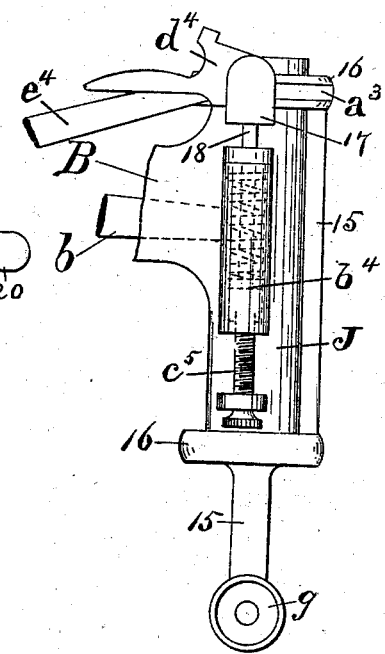
Figure 22:
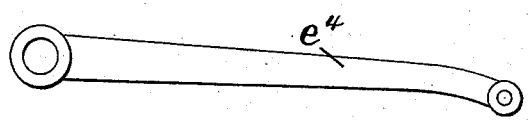
Figure 23:
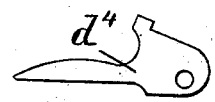

In the drawings hereto annexed, Figure 1 is a front elevation of a sewing-machine (excepting the motor parts) embodying my improvements. Fig. 2 is a top view of the same. Fig. 3 is a view of an eccentric and cam-slot. Fig. 3½ shows the mechanism for regulating the size of the stitch. Fig. 4 is a right-hand end view, on a larger scale, of some of the operative parts. Fig. 5 is a front view, large scale, of the feed-operating levers, in which the lever which operates the rotary feed-wheel which feeds from left to right is shown in position. Fig. 6 is a view of the same, in which the lever which operates the rotary feed device which feeds from front to rear is shown in position. Fig. 7 is a horizontal section of the cylinder and sleeve on the line shown at $x$, Fig. 1. Fig. 8 is a front side view, large scale, of part of the cylinder-arm. Fig. 9 is an end view of the sleeve and head which is mounted loosely on the fixed spindle of the round arm. Fig. 10 is a side view of the same parts. Fig. 11 is an end view of the rotary sleeve. Figs. 12 and 13 are views of the dog. Fig. 14 is a side view of the rotary sleeve without the cap at the end. Fig. 15 is a cross section of the round arm and cylinder-sleeve through line shown at $y$ in Fig. 7. The position of the shuttle-race is here shown. Fig. 16 is a side view of the rotary feed device E and adjacent parts. Fig. 17 is a diametrical section of the rotary feed-wheel. Fig. 18 is a side view of the parts shown in Fig. 16. Fig. 19 is a front view of presser device. Fig. 20 is a transverse or left-hand end view of same. Fig. 21 is a rear view of same. Fig. 22 is a view of the arm which stays the presser. Fig. 23 is a view of the cam-lever to raise presser.

The letter A designates the stand of the machine; B, the standard-arm which supports the needle-bar $a$ and its operative lever $b$. The letter C designates the balance-wheel, and $c$ the shaft on which the balance-wheel is mounted. These parts are of ordinary construction, and require no further description.

An eccentric, C', is mounted on the shaft $c$, and has an arm, $a'$, extending below to a link, $b'$, pivoted to the stand. Formed integral with or secured upon the upper side of the eccentric ring is an extension, in which is formed a cam-slot, $c^2$, in which slot the roller works which is on the end of the lever $b$. The construction and arrangement of the parts are such that the movement of the eccentric carries the cam-slot which operates the lever in a manner which gives the greatest power on the needle-bar just at the time when the material offers the greatest resistance to the needle.

The letter D designates the cylinder-sleeve, which has an endwise-sliding movement on the round arm $d$. The extent of the movement is indicated by the dotted lines 1 1, and is merely sufficient to shift the rotary feed-roller E from the position which it is seen to occupy in Fig. 1, where it is away from or at one side of the presser $g$, to the left, where it would come under the presser. A rotary cylinder-sleeve, D', is mounted on the extremity of the arm, and is a separate device from the sleeve D. Though being of the same diametrical size as the latter, it serves practically as a continuation of the sleeve D, the point of joinder being at the line 2 in Fig. 1. The sleeve D', it will be understood, has an endwise-sliding movement with the other part, D, and also has a rotary movement on the round arm. That end of the rotary cylinder-sleeve which adjoins the sliding sleeve D is provided with a serrated feed-face, $f$, which carries the material being sewed from the front to the rear.

One of the features of my invention consists in the combination, with the cylinder-arm, of two rotary feed devices, one of which rotates in a plane which is at a right angle to the plane in which the other rotates. It is a desideratum to have rotary feed devices thus disposed with respect to each other, because the rotary feed has a constant or continuous draw on the work or material, and in sewing the uppers of boots and shoes this continuous draw insures neat stitching, whereas if other forms of feed devices are employed the work is liable to slip. My arrangement of the two rotary feed devices is such that the work may be fed from left to right by the feed E, or from front to rear by the feed $f$. The cylinder-sleeve is provided with two needle-holes, one at 3 and the other at 4. The first is entered by the needle when feeding from left to right and the second when feeding from front to rear. The sliding of the the cylinder-sleeve enables the needle-holes to take position interchangeably below the needle $h$. The disk-presser $g$ is adapted, as hereinafter explained, to be swung around on a vertical axis, so as to bear on either feed device.

The round arm $d$ is provided with a long slot, $e$, extending through the arm in a vertical direction. (Shown in Fig. 7 and indicated by dotted lines $e$ in Fig. 8.) Through the front side of the arm is a shorter slot, $e'$, which passes at a right angle into slot $e$ on one side, and upon the other side of the said long slot $e$, and immediately opposite the side slot $e'$, is a socket or recess, $e^2$. The rotary feed-wheel E occupies position within the long slot $e$, and is mounted loosely on a fixed spindle, $i$, which latter has its bearings in the slot $e'$ and socket or recess $e^2$. The outer end of the spindle is secured to the sliding sleeve D by a cap-plate, $i'$. Thus it will be seen as the sleeve moves endwise the spindle slides in its bearings and the feed-wheel is moved in the slot $e$. The upper part of the said wheel projects through a slot in the top of the sliding sleeve, and the serrated face $f'$ of the said upper part comes in contact with the material which is being sewed.

The feed-wheel E is provided on one side with a flange, $k$, concentric with the serrated face, and which projects sidewise or laterally from the side of the wheel. The same side of the wheel is also provided with a hub, $k'$. (See Figs. 16 and 17.) A lever, L, is provided with a hole which fits loosely on the hub $k'$. The extremity of the lever has two lugs, $n$, which form a notch, 5, between the lugs. A clutch mechanism is provided, by which the swinging movement of the lever will cause the feed-wheel to be rotated with an intermittent movement. This mechanism consists of two ratchet-notches, $l$, on the exterior of the head part of the lever, through which the hub-hole passes. These notches are placed diametrically opposite each other, and between the two notches a lug, $m$, projects. A dog, F, (shown in Figs. 12, 13, and 16,) has a beveled end, $f'$, which engages with one of the notches $l$, and near the other end of the dog is a notch, $f^2$, in the edge transverse to the bevel. This notch fits over and moves around the flange $k$. Two dogs are employed. A spring, $g'$, connects one of the dogs and the lug $m$ in such manner that when the lever is moved in a direction which carries the lug away from the dog the spring will serve to draw the dog after it, while when the lever is moved in the opposite direction the first effect is that the ratchet-notch $l$ presses against the beveled end $f'$ of the dog, which causes the notch $f^2$ to bite on the flange $k$ of the feed-wheel, and as the dog is thus prevented from slipping loosely thereon, the feed-wheel is turned forward sufficient to make a stitch of the desired length. The other dog is connected by a spring to the lower curved part of the lever.

An up-and-down swinging movement is given to the extremity of the lever L by a rock-shaft, G, the end of which is provided with a lateral lug, $n'$, which engages in the notch 5 at the extremity of the lever, as seen in Fig. 7. Thus arranged, a rocking movement of the shaft G will give to the end of the lever L an up-and-down swinging movement, which will operate the clutch mechanism, and the latter will produce the intermittent movement of the rotary feed-wheel.

The rock-shaft G has its bearing in a groove, 7, extending along the front side of the round arm $d$, and another bearing at its right-hand extremity in the sliding block I. This latter device is mounted on a rod, 8, on which it is adapted to slide from right to left, the movement being to the same extent which the cylinder-sleeve D has. A lever, H, has one end, 9, pivoted to the stand of the machine, and near its center is pivoted to the sliding block by a stud-bolt, 10. By moving the free end of of the lever, which projects toward the front, the block I may be made to slide on its rod 8. A plate, 31, is secured to the right-hand end of the sliding sleeve D, so as to extend therefrom for a short distance in front of the shaft G. A notch, 32, is formed in the plate, and a block, 33, is secured to the rock-shaft G and occupies the notch in the plate. By this arrangement the block may oscillate in the notch when the shaft rocks, and said block and notched plate serve, when the shaft is moved endwise, to slide the sleeve D. A second rock-shaft, N, has its bearing in a groove on the opposite or rear side of the round arm $d$. As shown in the drawings, this shaft occupies the same horizontal plane as shaft G; but this shaft may have a position on a plane below that of shaft G, if more space were required in the cylinder $d$ for the location in the upper part thereof of the shuttle-race. The right-hand extremity of said shaft N is also attached to the sliding block I. At the opposite extremity or left-hand end of shaft N is a laterally-projecting finger, $p$. (See Figs. 7 and 9.) This finger curves down and up, its end $p'$ being on the front side of the round arm or cylinder and between the two lugs $q$, hereinafter described. This finger has a slight swinging movement when the shaft N rocks.

The extremity of the round arm $d$ is provided with a fixed spindle, $d'$, and a sleeve, R, is loosely fitted to and upon the spindle. A head, $r$, is attached at one end of the sleeve, (see Fig. 10,) and said head has at one side a notch, $r^2$, to afford room for the rock-shaft N, and diametrically opposite this notch are the two lugs $q$, between which the finger $p$ on the rock-shaft engages. The sleeve R is provided on diametrically-opposite sides with a slot, S. The rotary cylinder-sleeve D' is of such length that when the cylinders are moved to bring the needle-hole 3 and feed-wheel E in position for sewing from left to right the end of said rotary cylinder which adjoins the end of the sliding cylinder-sleeve will still be about the round arm $d$. The opposite or left end of the rotary cylinder-sleeve is provided with a head, $t$, having a central hole to permit the oscillation of the sleeve R, and is also provided with a flange, S'. The clutch mechanism by which the swinging movement of the finger will cause the cylinder-sleeve D' to be rotated with an intermittent movement is exactly like that which has heretofore been described to move the feed-wheel E.

Two dogs, F, are employed. The notch $f^2$ of each fits over and moves around the flange S', and the beveled end $f'$ of each dog enters one of the slots S in the sleeve. Between the two slots S, on each side of the sleeve and at diametrically-opposite points, are placed studs $m'$, and a spring, $g^2$, connects one of the dogs with each stud, and serves by drawing on the dog to move its notched end freely on the flange S' a distance sufficient to make the required stitch. Near the left-hand extremity of the round arm the groove in which the rock-shaft N has bearing takes the shape for a short distance of a round bore, as seen at 12 in Fig. 15, this bore serving to hold the rock-shaft in position and prevent it from bearing against the cylinder-sleeve D'.

It will be seen a rocking movement of the shaft N will give a slight up-and-down swinging movement to the finger $p$, which projects laterally from the extremity of said shaft, and the finger will cause the sleeve R to oscillate on the fixed spindle $d'$, and thus operate the clutch mechanism, which moves the cylinder-sleeve D'.

It will be seen by reference to Fig. 7 that the curved finger $p$ is between the head $r$ of the oscillating sleeve and the head $t$ in the end of the rotary cylinder-sleeve. A cap, 30, covers the end of the sleeve, and a bolt, N', enters through the cap and into the end of the rock-shaft N, and serves to secure the rotary cylinder-sleeve D' from coming off. This bolt also serves to draw the sleeve D' back—that is, from left to right. When the block I is moved by means of the lever H the entire feed mechanism heretofore described is moved.

A brief description will now be given of the mechanism employed to give motion to the rock-shafts G and N.

Upon the shaft $c$ is a cam-disk, T. (Shown in Figs. 2 and 4.) An upright lever, U, has its upper end provided with a pivoted friction-block, V, or other suitable device, which bears against the side of the cam-disk. The rotation of the latter, it will be seen, will give to the upright lever a movement. The lower end of the upright lever is keyed fast to a rock-shaft, A'. Upon the same shaft another lever, B', is secured, and this latter operates either of the feed rock-shafts G or N, as will presently be described.

Each feed rock-shaft is provided near the sliding block with an arm or lever. That on the shaft G is designated by the letter $a^2$, and that on shaft N by the letter $b^2$. The former curves upward and comes in contact with the extremity of lever B', and the latter, $b^2$, curves downward and comes in contact with a lug, $c^3$, on the lever B'. The levers $a^2$ and $b^2$ each have an end which projects toward the front or in the opposite direction from the curved part. A spiral spring, $w$, connects the front projected end of each of these levers with a plate, I', which is attached to the sliding block I. These springs by drawing on the front end of the levers serve to keep the curved ends raised and in position to be in contact with the lever B'. Only one of these levers is to be operated at a time, since only one stitch-feed rock-shaft is employed at once.

The letter M designates a device the office of which is to support one lever and so prevent its movement, while the other lever is left free to move. This device consists of a stationary plate, standing with edge upright and provided with two sloping edges, one at each end, and both sloping down toward the center. The highest sloping edge, $h^2$, regulates the lever $a^2$ and the lowest, $i^2$, regulates the lever $b^2$. It will be seen that upon moving the shifting lever H the levers $a^2$ and $b^2$ are moved laterally, one going down a slope to a position where it is free to move, the other going up a slope to a position where its curved end is removed from the range of the lever B'. Thus the lever B' will, when the machine is in operation, be in engagement with one or the other of the levers $a^2$ or $b^2$, and each movement of the upright lever U results in effecting a feeding of the material being sewed to the extent of one stitch.

The size of the stitch is regulated by the thumb-knob $q'$. This is effected by causing the rock-shaft A' to slide endwise in its bearings 34, which changes the point on the cam-disk T whereat the pivoted friction-block V of the lever U bears. If the friction-block of the said lever bears against the cam-disk near its rim, a large stitch is the result. If it bears near the axis of the cam-disk, a small stitch is the result. A threaded bolt is turned by the thumb-knob $q'$, and said bolt turns freely in one side of a two-part collar, 35, which is secured about a groove around the rock-shaft A'. It is only necessary therefore to turn the thumb-knob to effect the endwise movement of the rock-shaft.

The front side of the sliding block I is provided with two notches, 13, and a horizontal shaft, H', is secured in position near the front side of the block, and is provided with a lug adapted to enter one of the notches. A handle, 14, is attached to the shaft, by means of which it may be partially rotated. This constitutes a locking or retaining device. When the handle is turned in one direction the lug on the shaft is in position to engage with one of the notches, and thus will hold the sliding block from moving, and when turned in the opposite direction the block may be shifted to change the direction of the feed.

A brake device is employed to prevent the rotary cylinder-sleeve from moving backward. This device is shown in Figs. 7, 8, and 15, and consists of a spring, $y'$, secured in a recess, $z$, formed in the front side of the round arm. The spring by pressing against the inner side of the cylinder-sleeve D' serves to prevent it from turning, except when moved by the clutch mechanism. Upon the end of the shaft $c$ opposite that at which the balance-wheel C is mounted a driving-pulley, $c^4$, is secured.

The presser device which holds the material to be sewed against the feed-wheel is illustrated in detail in Figs. 19 to 23.

The presser proper consists of a disk, $g$, at the extremity of a bar, 15. This bar is secured by two rings, 16, to a head, J, at the end of the standard-arm B. The rings enable the presser-bar to swing partly around the head, and thereby to change the position of the disk $g$ so that it may be made properly to co-operate with either of the rotary feed devices.

The upper ring is provided with a groove, $a^3$, which extends partly around its periphery. A bracket, 17, is secured to the head near its upper end, and a rod, 18, passes down through the bracket and enters a cylinder or case, $b^4$, which contains a spiral spring. (Indicated by broken lines in Fig. 21.) This spring is so arranged as to draw down on the rod. A screw, $c^5$, enters the lower end of the case, and serves to increase or lessen the tension of the spring. A cam-lever, $d^4$, is secured to the upper end of the rod 18 by a short shaft, 19, (see Fig. 20,) and an arm, $e^4$, has one end attached to the short shaft and the other pivoted to the standard-arm B. The arm $e^4$ serves to stay the presser.

One end of the short shaft enters the groove $a^3$, and the cam-lever has its bearing on the bracket. By this arrangement the presser is held down by the spring and the rod 18, and is raised by elevating the cam-lever from the position it is seen to occupy in Fig. 21. The groove in the upper ring, 16, permits the presser to swing partly around and at the same time enables the spring and rod to have their action.

A thumb-piece, 20, is attached to the presser-bar 15, and serves as a means by which to turn the bar. The position of the shuttle-race 36 is shown in Fig. 15.

Any suitable mechanism may be employed to operate the shuttle, and as such forms no part of my invention, it is unnecessary to enter into a description here.

Having described my invention, I claim and desire to secure by Letters Patent of the United States—

1. In a sewing machine, the combination, substantially as set forth, of a needle-bar and two rotary feed devices movable with respect to the needle-bar, one of said feed devices being arranged to rotate in a plane at a right angle to the plane in which the other rotates.

2. In a sewing-machine, the combination, substantially as set forth, of a needle-bar, a cylinder adapted to have a sliding movement and provided with a feed device, and a cylinder adapted to have both a sliding and a rotary movement and provided with a feed device.

3. In a sewing-machine, the combination, substantially as set forth, of a needle-bar, a stationary arm, two movable cylinders mounted upon the arm, each cylinder carrying a rotary feed device, and two needle-holes so placed in the cylinders that one hole will be used in connection with each rotary feed device.

4. The combination, substantially as set forth, of a head, a needle-bar to play vertically through the head, a presser movably secured to and capable of moving partly around the head, and two rotary feed devices, each of which rotates in a plane a right angle with respect to the plane of the other.

In testimony whereof I affix my signature in presence of two witnesses.

WILLIAM ROBERTS.

Witnesses:
   JNO. T. MADDOX,
   CHAS. B. MANN.